United States Patent
Heinz et al.

(10) Patent No.: US 8,151,614 B2
(45) Date of Patent: Apr. 10, 2012

(54) VARIABLE ADJUSTABLE CUTOFF DEVICE FOR ROLL FORMERS

(75) Inventors: Richard D. Heinz, Grand Haven, MI (US); James H. Dodd, Tustin, MI (US); Wayne L. Ferris, Hesperia, MI (US)

(73) Assignee: Shape Corp., Grand Haven, MI (US)

( * ) Notice: Subject to any disclaimer, the term of this patent is extended or adjusted under 35 U.S.C. 154(b) by 986 days.

(21) Appl. No.: 12/129,152

(22) Filed: May 29, 2008

(65) Prior Publication Data

US 2009/0100889 A1    Apr. 23, 2009

Related U.S. Application Data

(60) Provisional application No. 60/980,554, filed on Oct. 17, 2007.

(51) Int. Cl.
*B21D 28/00* (2006.01)
(52) U.S. Cl. ............................................ 72/132; 72/169
(58) Field of Classification Search ............ 72/129–132, 72/169, 426; 414/745.1, 746.6, 746.8; 83/DIG. 2, 83/613
See application file for complete search history.

(56) References Cited

U.S. PATENT DOCUMENTS

| | | | |
|---|---|---|---|
| 5,092,512 | A | 3/1992 | Sturrus et al. |
| 5,305,625 | A | 4/1994 | Heinz |
| 5,454,504 | A | 10/1995 | Sturrus |
| 5,974,932 | A | 11/1999 | Suzuki et al. |
| 6,386,011 | B1 | 5/2002 | Levy |
| 7,337,642 | B2 | 3/2008 | Lyons et al. |
| 2006/0277960 | A1 | 12/2006 | Lyons et al. |
| 2007/0074556 | A1 | 4/2007 | Heatherington |
| 2007/0095001 | A1 | 5/2007 | Heatherington |
| 2007/0180880 | A1 | 8/2007 | Lyons |

FOREIGN PATENT DOCUMENTS

| | | |
|---|---|---|
| JP | 09-076114 | 3/1997 |
| JP | 09-094715 | 4/1997 |
| JP | 09-141329 | 6/1997 |

*Primary Examiner* — Dana Ross
*Assistant Examiner* — Pradeep C Battula
(74) *Attorney, Agent, or Firm* — Price Heneveld LLP

(57) ABSTRACT

A cutoff unit for cutting a variably swept continuous beam extending from a roll forming mill includes a pickup subassembly for tracking a shape of the continuous beam, and a cutoff subassembly that engages and supports sides of the continuous beam while a blade slices transversely through the continuous beam. A controller connected to the roll forming mill and to the cutoff unit controls the cutoff unit to allow pass through of the continuous beam, and is configured to actuate the pickup and then actuate the blade to cut the continuous beam into longitudinally symmetrical beam segments, each having a center section (swept or not) and with mirror-image equally-swept end sections.

9 Claims, 9 Drawing Sheets

VARIABLE ADJUSTABLE CUTOFF DEVICE FOR ROLL FORMERS

This application claims benefit under 35 U.S.C. §119(e) of provisional application Ser. No. 60/980,554, filed Oct. 17, 2007, entitled VARIABLE ADJUSTABLE CUTOFF DEVICE FOR ROLL FORMERS, the entire contents of which are incorporated herein.

BACKGROUND

The present invention relates to cutoff devices for cutting a roll formed continuous beam having a multi-curved longitudinal shape as it exits a roll former mill.

A known prior art cutoff device (see Heinz U.S. Pat. No. 5,305,635) is able to cut a (single radius) swept tubular continuous beam into beam segments. The beam segments each have a predetermined length and shape making them useful as bumper reinforcement beams. Recently, Shape Corporation employees have conceived of an apparatus and method involving a sweep station at the end of a roll former that allows a continuous beam to be given multiple/different sweeps. Beam segments can be cut from the continuous beam that have increasingly curved ends, thus providing beam segments matching the designed vehicle shape without the need for secondary processing to reform ends of the beam segment. This saves considerably by reducing secondary processing of the beam segments. A problem is that a continuous beam with multiple/different sweeps tends to oscillate up and down quite dramatically as a first curved shape first exits the sweep station and then as a second more-curved (or less curved) shape exits the sweep station, especially when the roll former is operated at significant line speeds. The cutoff device in Heinz '635 is not able to handle this oscillating movement when the movement is rapid and substantial.

SUMMARY OF THE PRESENT INVENTION

In one aspect of the present invention, an apparatus includes a roll former for roll forming a sheet of material into a continuous beam, and a rapidly-adjustable power sweep unit in-line with the roll former for sweeping the continuous beam into a curvilinear shape having longitudinal sections with at least two different sweeps at selected locations. A cutoff unit is provided in-line with the sweep unit for cutting the continuous beam, the cutoff unit including an extendable pin for engaging the continuous beam to temporarily move the cutoff unit along with the continuous beam and including a guillotine-type cutting blade for cutting a beam segment of predetermined length from the continuous beam. A controller is operably connected to the roll former, the sweep unit, and the cutoff unit for controlling coordinated cyclical adjustment of the sweep unit and coordinated actuation of the cutoff unit, whereby the beam segments have a desired length and have the at least two different sweeps at desired locations along the desired length.

In another aspect of the present invention, a cutoff unit is provided for receiving a continuous beam from a roll former apparatus, where a length of the continuous beam has different longitudinal sweeps. The cutoff unit includes a pickup device that rollingly engages and tracks with the continuous beam as the continuous beam exits the roll former apparatus. The pickup device includes an extendable pickup member for engaging the beam to cause the pickup device to temporarily move with the continuous beam and includes a shock absorber to reduce impact when the pickup member engages the continuous beam and first begins to move therewith. A cutter device is attached to the pickup device for cutting the continuous beam, and a controller is operably connected to the pickup device and to the cutter device to actuate the extendable pickup member to engage the continuous beam and then actuate the cutter device to cut a beam segment of predetermined length from the continuous beam.

In a narrower aspect, the beam is tubular (for example, "D" or "B" shaped beams), and the pickup device and the cutter device are adapted to receive the beam as a position of the beam changes dramatically as the beam exits a roll former due to the different longitudinal sweeps.

In another aspect of the present invention, a cutoff unit is provided for receiving a continuous beam from a roll former apparatus, where a length of the continuous beam has different longitudinal sweeps. The cutoff unit includes a pickup device adapted to engage the continuous beam as the continuous beam exits the roll former apparatus. A cutter device is pivoted to the pickup device at a pivot and also is attached thereto by an adjustable link for adjusting an orientation of the cutter device relative to the pickup device.

In still another aspect of the present invention, a method includes providing a roll former for roll forming a sheet of material into a continuous beam, and providing a rapidly-adjustable power sweep unit in-line with the roll former for sweeping the continuous beam into a curvilinear shape having longitudinal sections with at least two different sweeps at selected locations. Further, the method includes providing a cutoff unit in-line with the roll former for cutting the continuous beam. The cutoff unit includes an extendable pin for engaging the continuous beam to temporarily move the cutoff unit along with the continuous beam and includes a guillotine-type cutting blade for cutting a beam segment of predetermined length from the continuous beam; and controlling coordinated cyclical adjustment of sweep unit and coordinated actuation of the cutoff unit to cause the beam segments to have a desired length and to have the at least two different sweeps at desired locations along the desired length.

In a narrower form, the present invention includes connecting a controller to the roll former, the sweep unit, and the cutoff unit, and includes programming the controller for coordinating movement of same.

These and other aspects, objects, and features of the present invention will be understood and appreciated by those skilled in the art upon studying the following specification, claims, and appended drawings.

BRIEF DESCRIPTION OF DRAWINGS

FIG. 1A is a top view of a bumper reinforcement beam segment cut from the continuous beam made via the apparatus of FIG. 1, and FIG. 1B is a cross section through FIG. 1A.

DETAILED DESCRIPTION OF PREFERRED EMBODIMENTS

Figure 1:
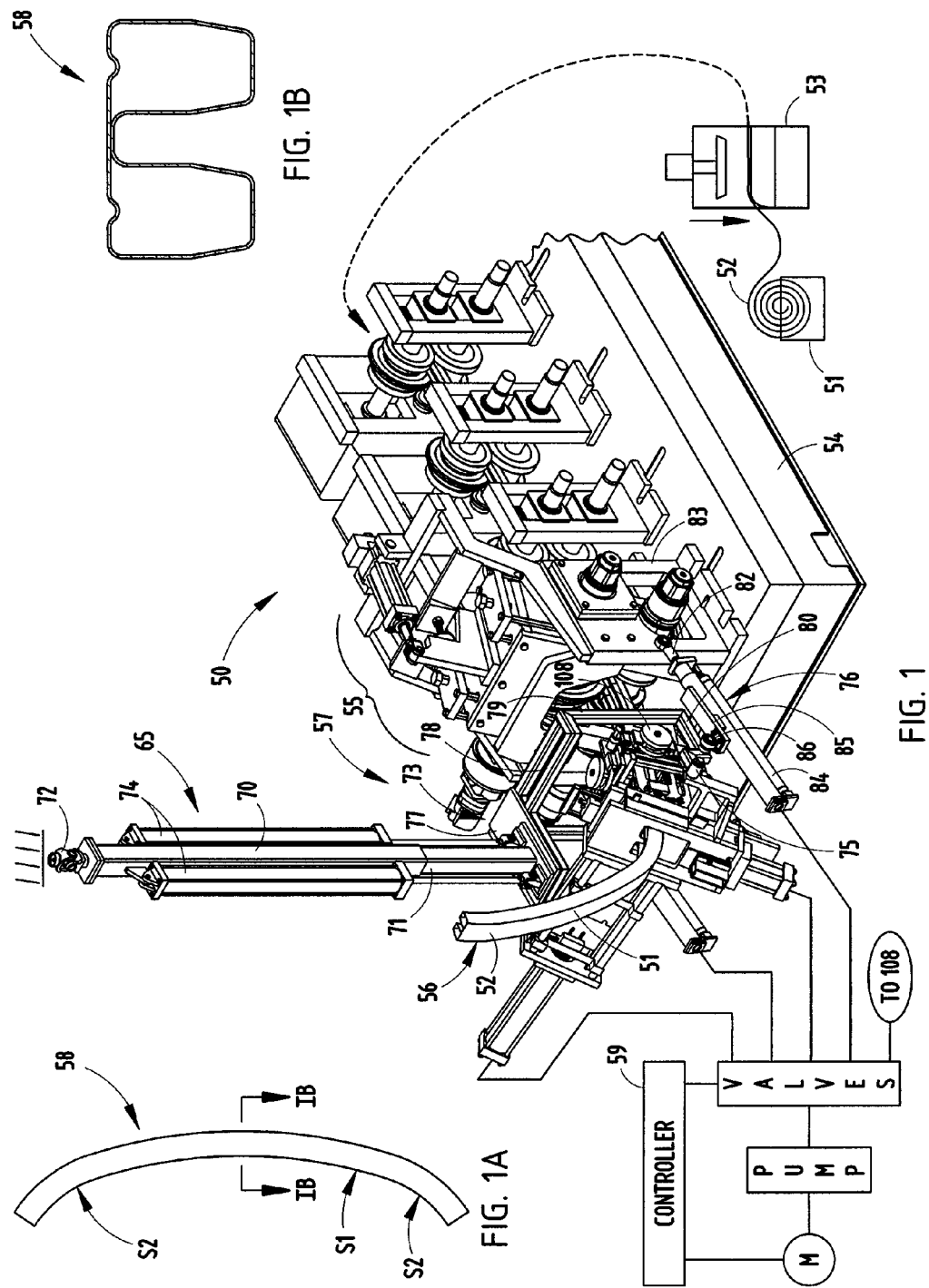
FIG. 1 is a side view of a roll forming apparatus including an in-line variable sweep station and an in-line cutoff unit connected to the sweep station embodying the present invention, the cutoff unit including a pickup assembly and a cutoff assembly.
Figure 2:
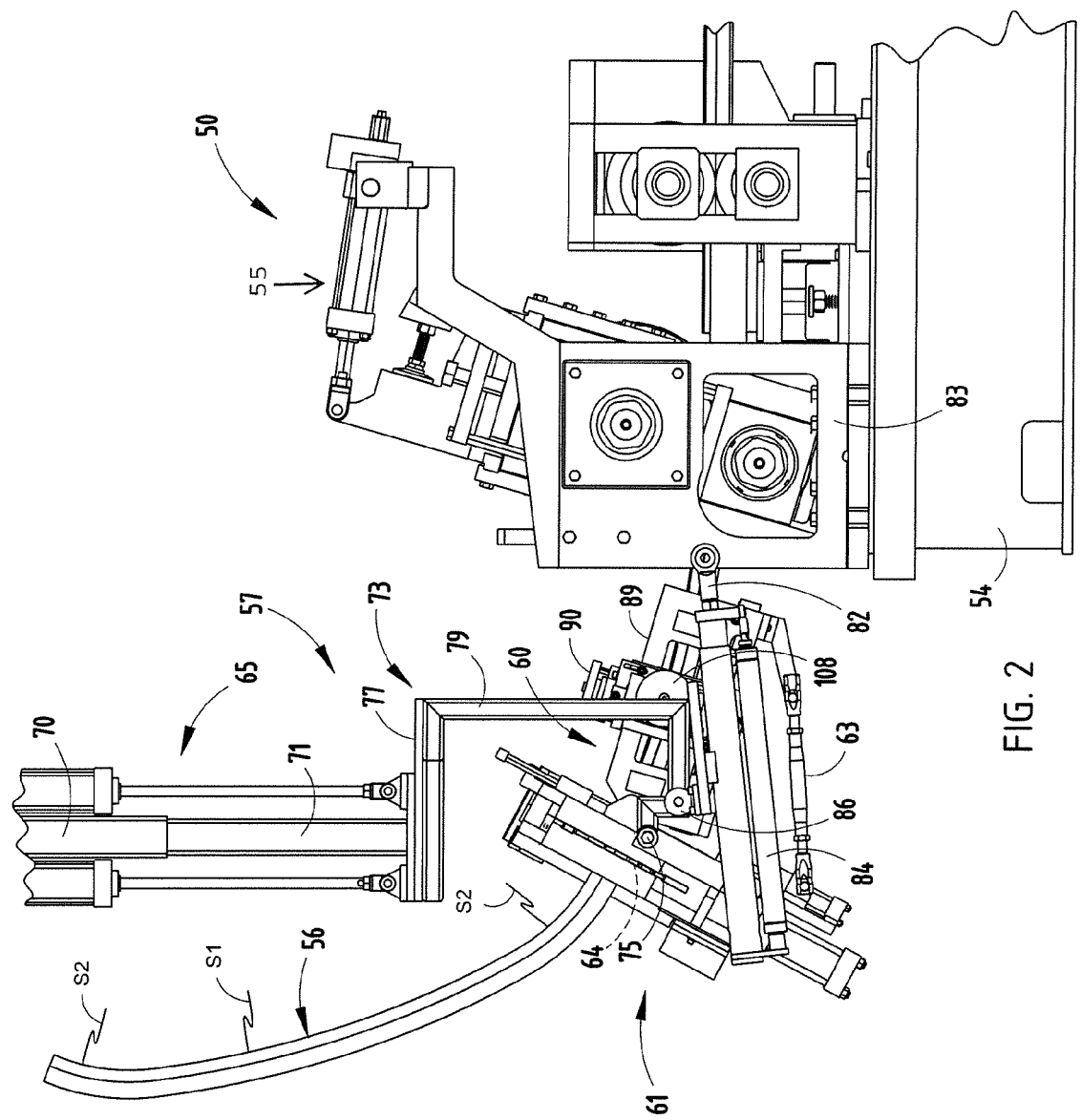
FIG. 2 is a perspective view of the cutoff unit of FIG. 1.

It is contemplated that the present apparatus can be used in various orientations, and thus relational terms such as "upper," "lower," "top," "bottom," "sides," "right," "left," "vertical," "horizontal," and the like are used only to facilitate description, and are not intended to be unnecessarily limiting.

The illustrated apparatus 50 (FIG. 1) includes an uncoiler 51 for uncoiling a roll of steel sheet material 52, a stamper 53 for forming holes at predetermined locations in the sheet material 52, a roll former 54 with in-line automatically-variable sweep unit 55 for forming a multi-swept continuous beam 56, and a cutoff unit 57 for cutting the continuous beam 56 into beam segments 58 with a centered large radius sweep S1 and end sections with smaller radius sweeps S2. The apparatus 50 may include a welder near an end of the roll former 54 for welding the sheet 52 into a permanent tubular shape. It is noted that roll formers with in-line sweep units are known in the art, such that the present disclosure is sufficient for a person skilled in this art. However, for additional detail the reader is directed to co-assigned U.S. Pat. Nos. 5,092,512; 5,454,504; and 7,337,642, and also to co-assigned application Ser. No. 11/689,320, filed Mar. 21, 2007, all of which are incorporated herein by reference in their entirety.

The illustrated apparatus 50 can roll form and produce multi-swept beam segments 58 at high volumes and with high dimensional accuracy in near net final shapes that match a front (or rear) of a vehicle, but with relatively few secondary processes. During operation of the apparatus 50, the continuous beam 56 is swept to include different curvatures (such as illustrated sweeps S1 and S2) such that it oscillates and "waves" dramatically up and down as the beam 56 exits the roll former 54. This oscillating movement increases in speed and amplitude when the sweeps S1 and S2 are significantly different, and/or when a speed of the roll former 54 is increased, and/or when a length of the beam segment 58 is quite long (e.g., a bumper reinforcement beam which extends a width of a vehicle frame), and/or when the sweeps S1 and S2 are in opposite directions. The present cutoff unit 57 is adapted to accommodate the large oscillating movement and still cut the continuous beam 56 into beam segments 58 with accuracy in length and with accuracy in longitudinal positions of the sweeps S1 and S2. For example, it is contemplated that a longitudinal position of the sweeps S1 and S2 can be made accurate to within less than about 1-2 mm, thus allowing the radii of sweeps S1 and S2 to be accurate to within about 2-3 mm even near ends of the sweeps S1 and S2 . . . while still allowing the beam segments 58 to be produced at 100 fps or more line speeds and while still meeting the very tight dimensional standards of automotive parts. Further, the present cutoff unit 57 is able to accommodate and accurately cut beam segments 58 with different sweeps, such that two different bumper reinforcement beam segments (each having an identical cross-sectional shape but different S1 sweeps and different S2 sweeps) can be made on the same roll former apparatus substantially without stopping the apparatus 50.

Figure 3:
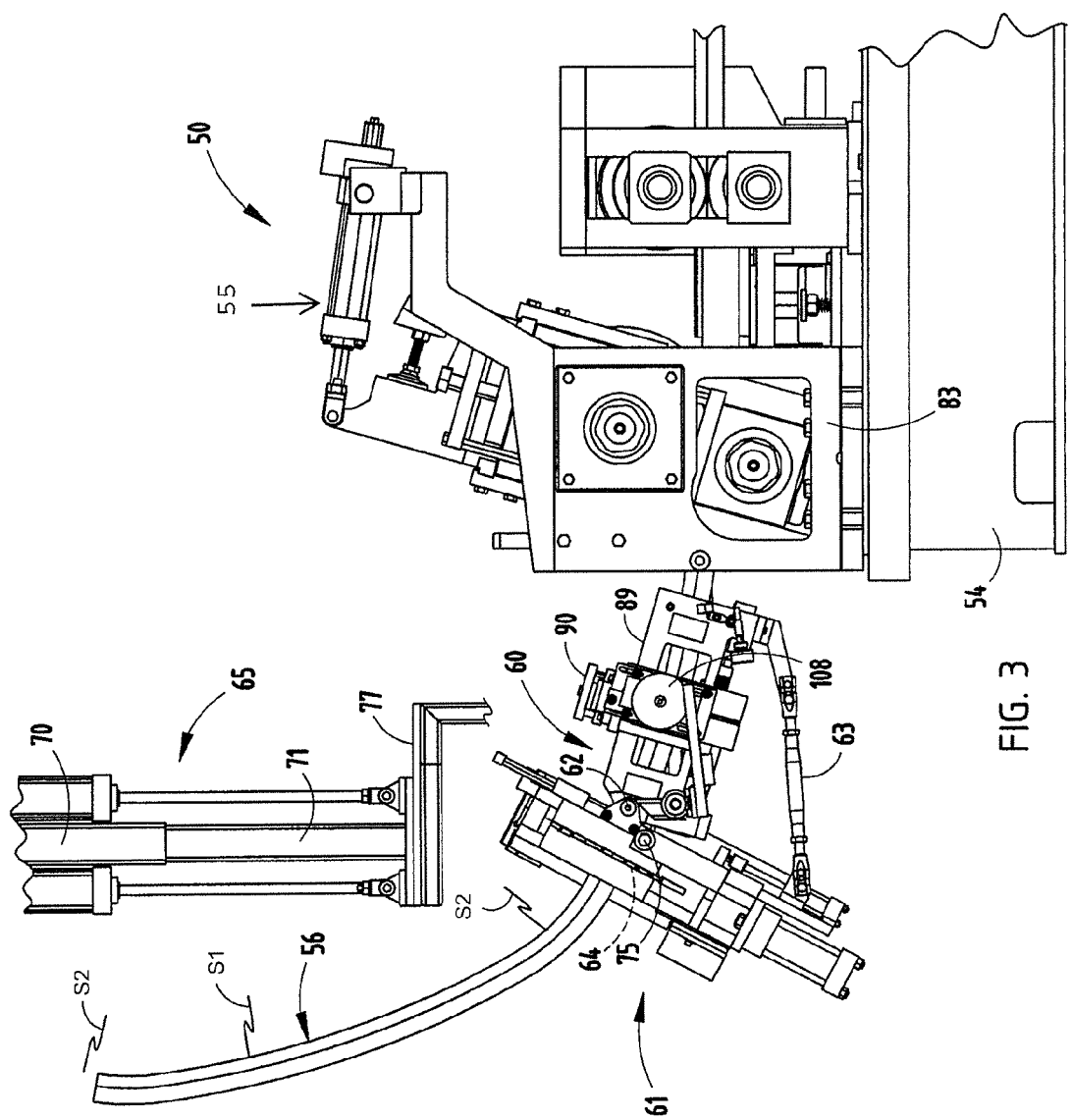
FIG. 3 is a perspective view similar to FIG. 2 but with the overhead counterbalance unit and pull-back cylinders of the cutoff unit removed.

The present cutoff unit 57 (FIG. 3) includes a pickup device 60 (also called pickup assembly) and a downstream cutter device 61 (also called cutoff assembly) pivoted to the pickup device 60 at pivot 62 and also attached thereto by adjustable link 63 at the bottom to form a triangular supportive arrangement. This arrangement allows the orientation of the cutting blade 64 to be adjusted to a desired cutting angle and then fixed relative to a continuous beam 56 passing therethrough. The pickup device 60 includes an extendable pin 66 that is extendable to accurately engage a hole in the continuous beam 56, so that the cutoff unit 57 travels temporarily along with the continuous beam 56 as the cutoff blade 64 is operated.

The center of gravity of the cutoff unit 57 (including devices 60 and 61) is basically at pivot 75, which is spaced slightly below and away from the pivot 62. It is noted that the relationship between pivot 75 and pivot 62 has no effect on the operation of the unit. A weight of the cutoff unit 57 is supported by an overhead counterbalance 65 (FIG. 1). The rollers and bearings on the device 60, assisted by the counterbalance 65, cause the cutoff unit 57 to rotationally and translatingly track with the continuous beam 56 as the beam 56 exits/extends from the sweep unit 55 through the cutoff unit 57. Also, the rollers and bearings assist in keeping the devices 60 and 61 in position (i.e., traveling with the continuous beam 56) during the step of actuating a cutoff blade 64 to separate a bumper beam segment 58 from the continuous beam 56. Also, after the cut is made, the rollers allow the cutoff unit 57 to roll back along the continuous beam 56 in an upstream direction toward its home position adjacent the sweep unit 55.

The several actuators associated with the cutoff unit 57 are all connected to a controller 59 (FIG. 1) (which is also connected to the roll former 54 and the variable sweep unit 55) for coordinated operation so that when the beam segment 58 is cut off, it has equally-swept end sections with a sweep S2 defining a smaller radius at each end, and has a swept (or linear) center section with a sweep S1 defining a larger radius.

There is an actuator 150 in the cutoff system with a cylinder that changes the relationship, more or less vertically, of the cutter device 61 to the pickup device 60. During the process of cutting the part this cylinder functions as follows: After the pickup pin 66 has been engaged and the beam 56 is in position longitudinally to be cut, cylinder 150 lowers the cutter device 61 down to a point where the upper cutting steels are in contact with the top of the beam 56. At this point the wall-supporting member 68 is raised by cylinder 124, cylinder 141 extends cutting the beam and then retracts. Cylinder 124 then retracts lowering the wall-supporting member 68. Then cylinder 150 raises the cutter device 61 up to the home position allowing clearance for the beam and its multiple sweeps to pass through the cut off unit without contacting the cutting steels.

By using a programmed controller 59, two different beam segments can be made, each having a same cross section (from the roll former 54) but with different S1 sweeps and/or different S2 sweeps and/or different lengths. Notably, by using the roll former and sweep apparatus shown in application Ser. No. 11/689,320, filed Mar. 21, 2007, a beam segment can be severed from the continuous beam, with opposing swept sections accurately located longitudinally therein. This accurate position of the sweeps is important since any error in location is compounded by dimensional out-of-tolerance conditions in both adjacent beam segments 58.

Figure 7:
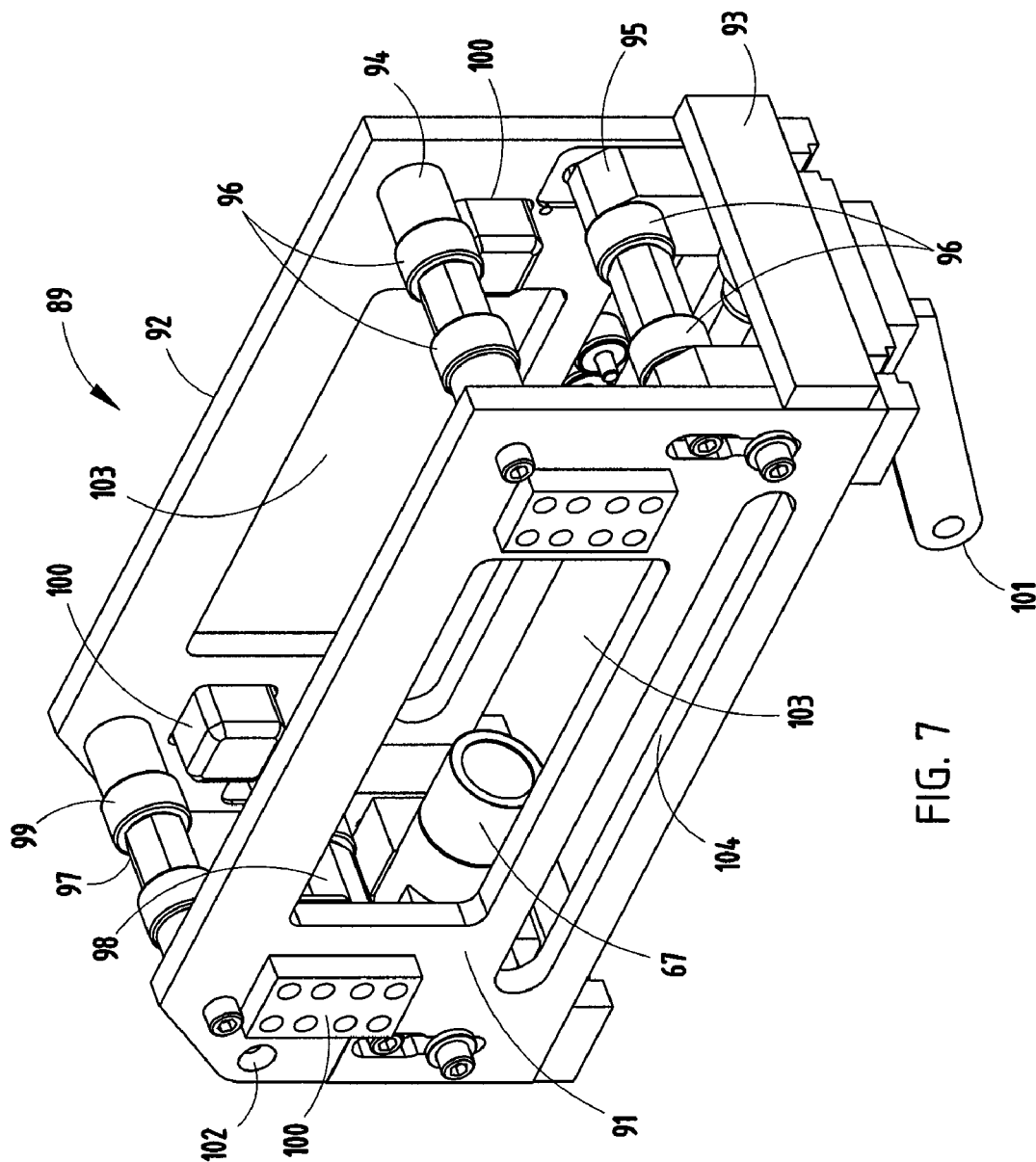
FIG. 7 is a perspective view of the beam-engaging pickup carriage of the pickup assembly of FIG. 6.
Figure 9:
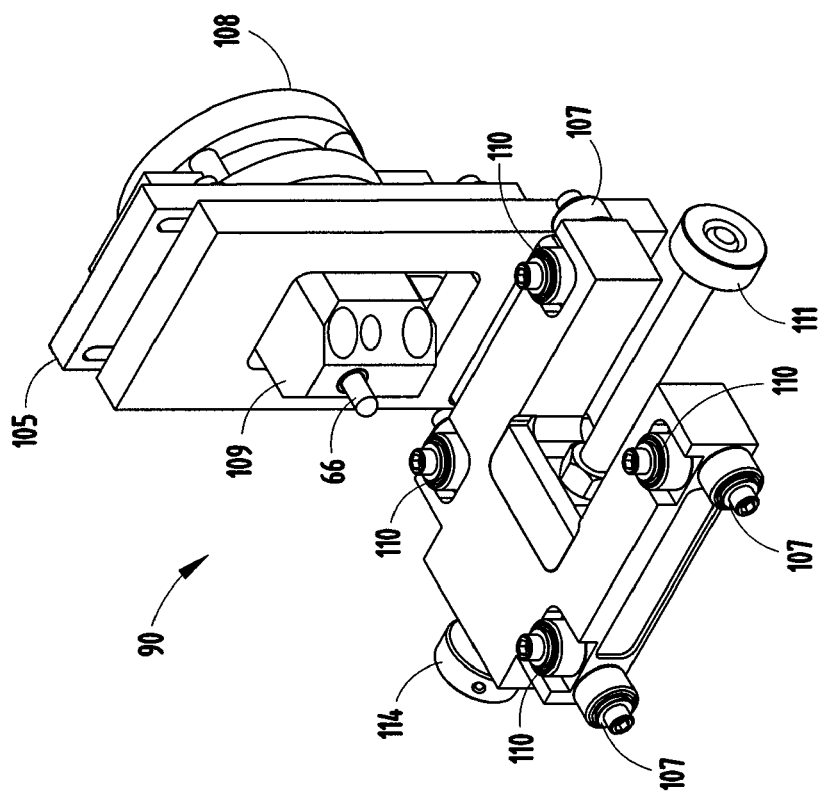
FIGS. 8-9 are perspective views of the pickup pin and actuator and associated subframe of the pickup assembly of FIG. 6.

As defined in the claims, the apparatus 50 includes a roll former 54 for roll forming a sheet of material 52 into a continuous beam 56, and a rapidly-adjustable power sweep unit 55 in-line with the roll former 54 for sweeping the continuous beam 56 into a curvilinear shape having longitudinal sections with at least two different sweeps S1 and S2 at selected locations. A cutoff unit 57 is provided in-line with the roll former 54 for cutting the continuous beam 56, the cutoff unit 57 including an extendable pickup member (i.e., pin 66 (FIG. 9)) for engaging the continuous beam 56 to temporarily move the cutoff unit 57 along with the continuous beam 56 and including a guillotine-type cutoff blade 64 for cutting a beam segment 58 of predetermined length from the continuous beam 56. The pickup device 60 also includes a shock absorber 67 (FIG. 7) to reduce impact when the pickup member 66 engages the continuous beam 56 and first begins to move therewith. A controller 59 (FIG. 1) is operably connected to the roll former 54, the sweep unit 55, and the cutoff unit 57 for controlling coordinated cyclical adjustment of sweep unit 55 and coordinated actuation of the cutoff unit 57, whereby the beam segments 58 have a desired length and have the at least two different sweeps S1 and S2 at desired locations along the desired length.

Figure 10:
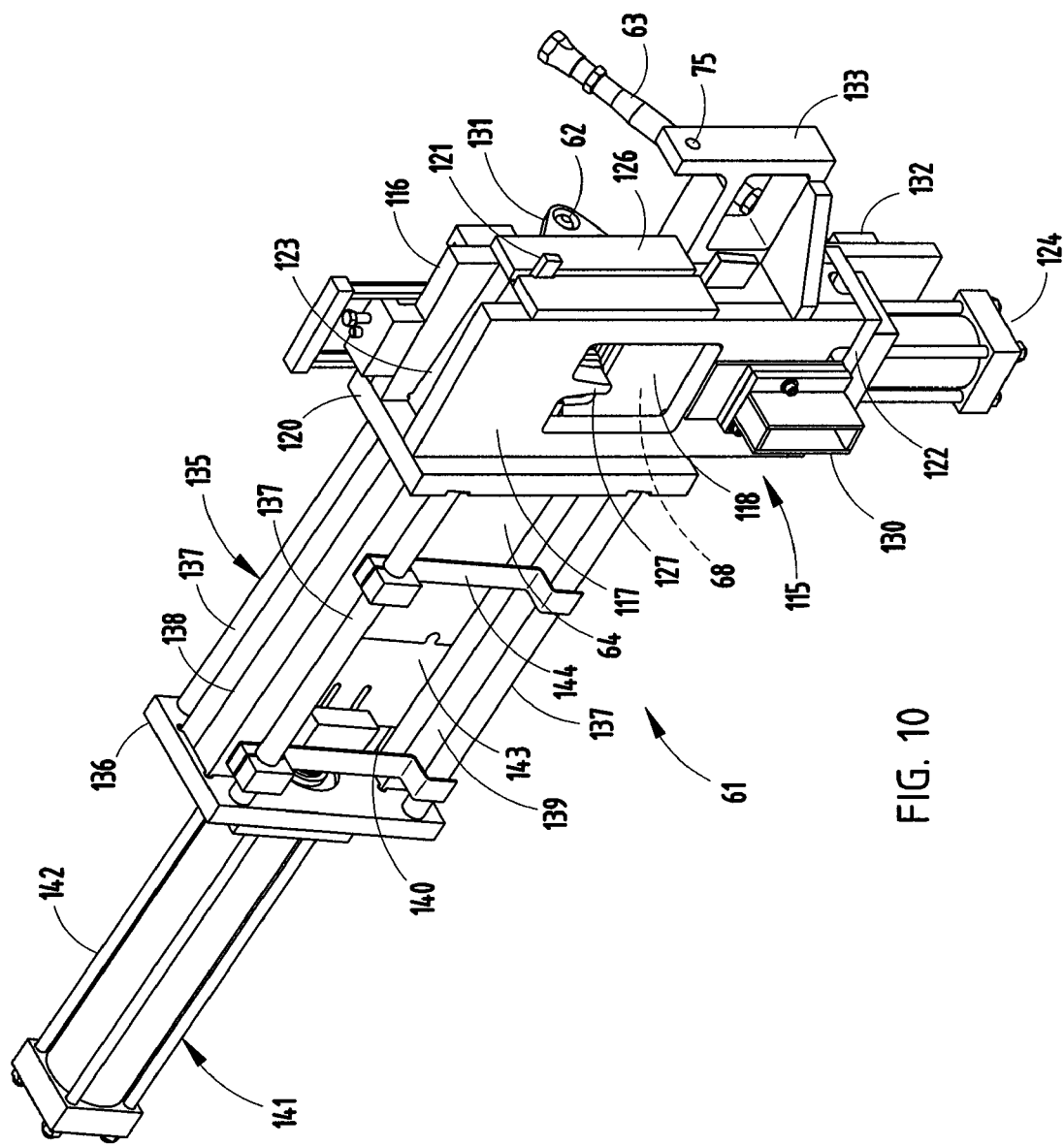
FIG. 10 is a perspective view of the cutoff assembly of FIG. 6.

Notably, the beam can be tubular (for example, "D" or "B" shaped beams) or define an open channel (for example, "C" or "L" or "Z" or "I" shaped beams), and the pickup device and the cutter device are adapted to receive the beam as a position of the beam changes dramatically as the beam exits a roll former due to the different longitudinal sweeps. In tubular beams (and potentially in open channel beams), the cutter device 61 includes a wall-supporting member 68 (FIG. 10) that clamps against sidewalls and lower face of beam 56 (as oriented when exiting the roll mill 54) immediately prior to actuation of the cutoff blade 64.

In still another aspect, a method includes providing a roll former 54 for roll forming a sheet of material 52 into a continuous beam 56, and providing a rapidly-adjustable power sweep unit 55 in-line with the roll former 54 for sweeping the continuous beam 56 into a curvilinear shape having longitudinal sections with at least two different sweeps S1 and S2 at selected locations. Further, the method includes providing a cutoff unit 57 in-line with the roll former 54 for cutting the continuous beam 56, the cutoff unit 57 including an extendable pickup member 66 for engaging the continuous beam 56 to temporarily move the cutoff unit 57 along with the continuous beam 56 and including a guillotine-type cutoff blade 64 for cutting a beam segment 58 of predetermined length from the continuous beam 56; and controlling coordinated cyclical adjustment of sweep unit 55 and coordinated actuation of the cutoff unit 57 such as by using a programmable controller 59 to cause the beam segments 58 to have a desired length and to have the at least two different sweeps S1 and S2 at desired locations along the desired length. The controller 59 is programmed to coordinate movement and action of the roll former 54, the sweep unit 55, and the cutoff unit 57, as well as other components associated with the apparatus 50.

The counterbalance 65 (FIG. 1) includes a pair of telescoping (tubular) guide members 70 and 71. The top guide member 70 is pivotally attached to and supported by an overhead bracket 72 secured to a stationary object, such as a roof truss or the like. The bottom tubular guide member 71 is attached to cutoff-unit-supporting lower bracket 73, which is pivoted to the cutoff unit 57 at a pivot 75 located approximately at the center of gravity of the cutoff unit 57. Two counterbalance biasing devices, such as actuators 74, are positioned on opposing sides of the tubes 70 and 71. The illustrated biasing devices/actuators 74 include a cylinder and extendable rod, and are pressurized/powered to provide a vertical lift approximately equal to a total "active" weight being carried—which includes a lower portion of the counterbalance 65, the lower bracket 73, the cutoff unit 57, and a portion of the continuous beam 56 extending from the sweep unit 55, as well as a weight of cutoff return actuators 76 for returning the cutoff unit 57 to its home position.

The lower bracket 73 includes a top brace 77, a cross brace 78, downward leg braces 79 on each side, and forward leg braces 80. The forward leg braces 80 are connected to the cutoff unit 57 at center-of-gravity pivot 75. Notably, cutter device 61 includes an actuator and cutoff blade positioned to one side of the cutoff unit 57, which causes its center of gravity to be offset laterally from the continuous beam 56 (when viewed from above). As a result, the top brace 77 and counterbalance components 70-72, 74 are located in a laterally offset position in a sideways direction in order to be closer to the actual center of gravity of the cutoff unit 57.

The return actuators 76 for the cutoff unit 57 are positioned on opposing sides, and each include an extendable rod 82 pivoted to the side frame 83 of the sweep unit 55, and include a cylinder 84. The cylinder 84 includes a bracket 85 attaching it to the leg braces 80 at pivot 86. The controller 59 is programmed and operably connected to the actuators 76 (e.g. via a hydraulic circuit including valves) to cause the actuators 76 to assist in returning the cutoff unit 57 to its home position adjacent the cutoff unit 57 after a cut has been made. Also, the controller 59 can be programmed to utilize the actuators 76 to facilitate movement in a downstream direction if desired (e.g., when the pickup device 60 is being actuated to extend the pickup pin 66, or has been actuated).

Figure 8:
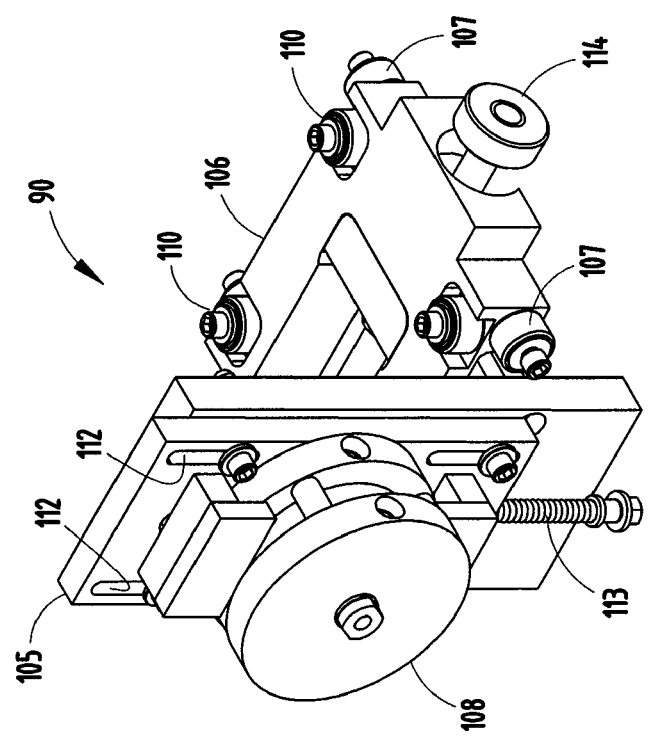

The pickup device 60 (FIG. 3) includes a box-like carriage frame 89 (FIG. 7) and a pickup pin-and-actuator subassembly 90 (FIGS. 8-9) slidably mounted thereon. The carriage frame 89 (FIG. 7) includes side panels 91 and 92, transverse braces 93, upstream transverse axles 94 and 95 that support upper and lower beam-engaging upstream rollers 96, and downstream rear transverse axles 97 and 98 that support upper and lower beam-engaging downstream rollers 99. The lower axles 95 and 98 (or the upper axles) are vertically adjustable. The rollers 96 and 99 rollingly engage top and bottom surfaces of the continuous beam 56, such that the carriage frame 89 allows the continuous beam 56 to slide therethrough when the frame 89 is stationary, and also such that the carriage frame 89 can roll in an upstream direction on the continuous beam 56 after a cut (i.e., as the frame 89 is moving toward its home position adjacent the sweep unit 55).

Various items are attached to the carriage frame 89, such as the shock absorber 67 (attached to the downstream end), side bearing blocks 100 (attached to side panels 91 and 92), an anchor bracket 101 (for attachment to the adjustable link 63), and a transverse hole 102 (for attachment to the cutoff device 61 at the pivot 62). The shock absorber 67 can be any one of a variety of different things, such as a resilient rubber block or a friction-piston shock absorber with spring-, air-, or fluid-containing components. The side panels 91 and 92 each include a first window 103 for receiving the extendable pickup pin member 66, and an elongated slot 104 below the window 103 for defining a track.

The pin-and-actuator subassembly 90 (FIGS. 8-9) includes a side plate 105 and bottom plate 106 secured together in an L-shaped arrangement. The bottom plate 106 includes rollers 107 (or bearings) for rolling along the slots 104. An actuator 108, such as a pneumatic-, hydraulic-, or electromechanically-driven cylinder, is attached to side plate 105 and includes a block 109. The illustrated block 109 does not slide on the edges of window 103. Its function is to guide pin 66. Block 109 is attached to block 105 which allows for vertical adjustment of pin 66. The pickup pin member 66 extends from the block 109. Rollers 110 are provided on the plates 106 for engaging plates 91 and 92 to guide the subassembly 90 in a longitudinal direction. The illustrated bearing block 109 also does not engage a side of the beam 56. Adjustment devices, such as adjuster devices 111-113 and shock absorber stop 114, are provided for adjusting a position of components on the subassembly 90 and on pickup device 60.

In operation, the continuous beam 56 extends through the carriage frame 89 until the controller 59 senses a position of a locating hole(s) in the continuous beam 56, such as by photo sensors or other sensors at the sweep station (or in other places along the apparatus 50). When the locating hole is sensed, the smaller-radius sweep S2 is in an appropriate location, the pickup pin 66 is extended by the actuator 108 into the locator hole in the continuous beam 56, and the cutoff unit 57 begins to temporarily move with the continuous beam 56. The initial shock of engagement is dampened by the shock absorber 67 engaging a side of the pin-and-actuator subassembly 90 as the subassembly 90 moves a short distance on the carriage frame 89. After the cutter device 61 operates, the pin 66 is retracted, and the actuators 84 return the cutoff unit 57 to a home position, potentially assisted by gravity as the carriage frame 89 rolls along the uncut portion of the continuous beam 56. The shock absorber 67 also assists in biasing the pin-and-actuator subassembly 90 to its upstream position on the carriage frame 89. It is contemplated that an additional actuator can also be provided to perform this function if necessary.

The cutter device 61 (FIG. 10) includes a subframe 115 defining a cutting chamber and includes upstream and downstream plates 116 and 117 defining upstream and downstream enlarged apertures 118 for receiving the moving and waving continuous beam 56. The apertures 118 are sized to receive the beam 56 regardless of where the sweeps S1 and S2 are located . . . keeping in mind that the cutter device 61 is normally stationary but intermittently moves as a unit with the pickup device 60 by pivot 62 and link 63. Additional plates and structure are added to complete the subframe 115, including right and left side plates 120 and 126, bottom plate 122, and top plate 123. A clamp actuator 124 is mounted to the bottom plate 122 and is attached to a movable wall-supporting external mandrel 68 guided by wear plates on block 126 to engage a bottom of the continuous beam 56 at the time of cutting the beam 56. A similar arrangement can be provided for engaging a top of the beam 56, or the walls of the beam 56 can be supported during cutting by other structure, such as supporting top wall and protrusions 127 on the plate 116. A guard 130 extends from under the cutting chamber and is configured to protect proximity switches on the cutoff 20 from being damaged. The scrap exits through an opening 151 between blocks 126. (The flow of strips can be assisted by air blasts or vibration if necessary, but movement of the cutoff unit 57 normally combines with gravity to provide sufficient flow of scrap.) Anchor brackets 131 and 132 are provided for attachment at pivot 62 and to link 63. An anchor bracket 133 is provided for defining the hole located at the center of gravity pivot 75.

Figure 4:
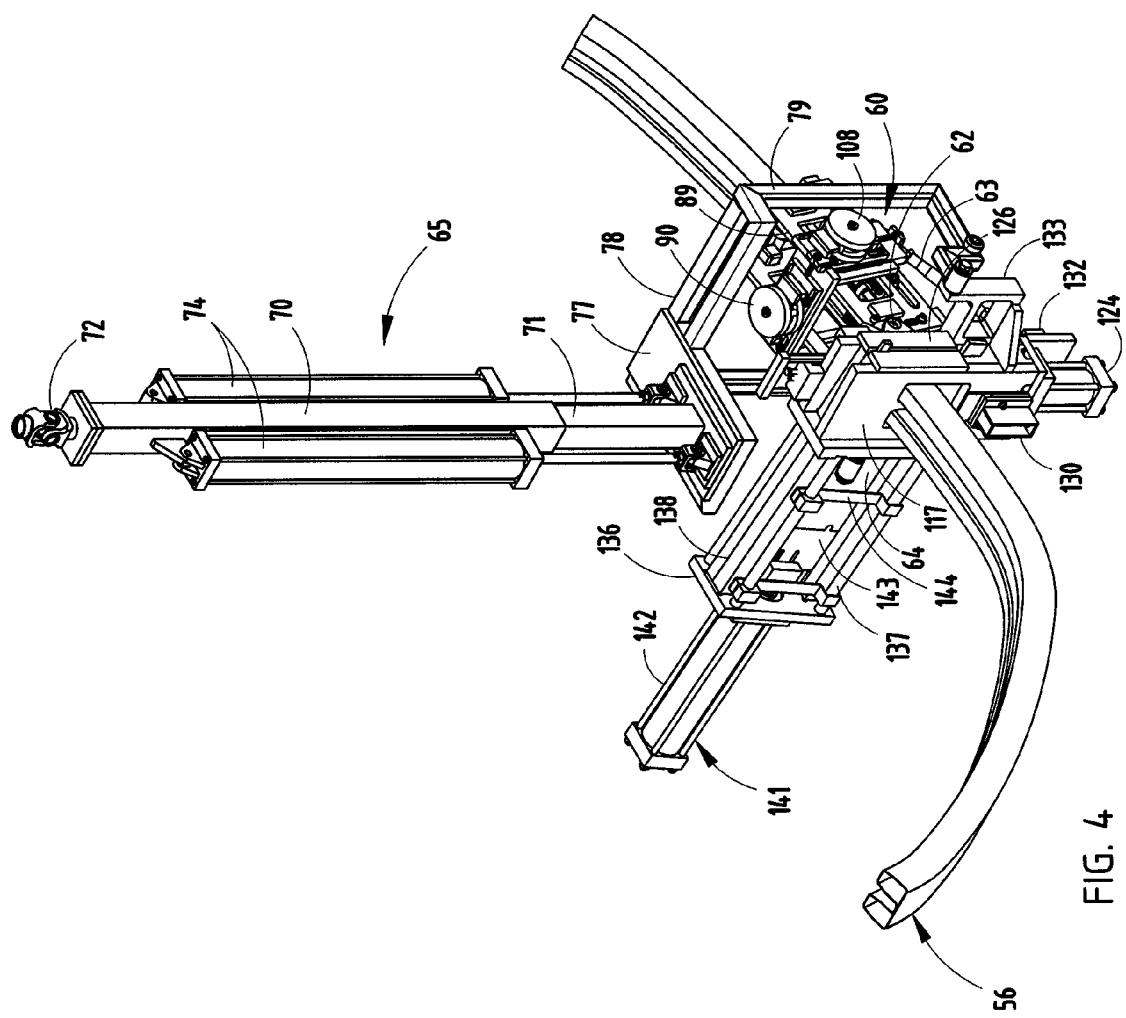
FIG. 4 is a perspective view of the cutoff unit and counterbalance unit of FIG. 1, and FIGS. 5-6 are perspective views similar to FIG. 4 but with the counterbalance unit removed and with the continuous beam removed.
Figure 5:
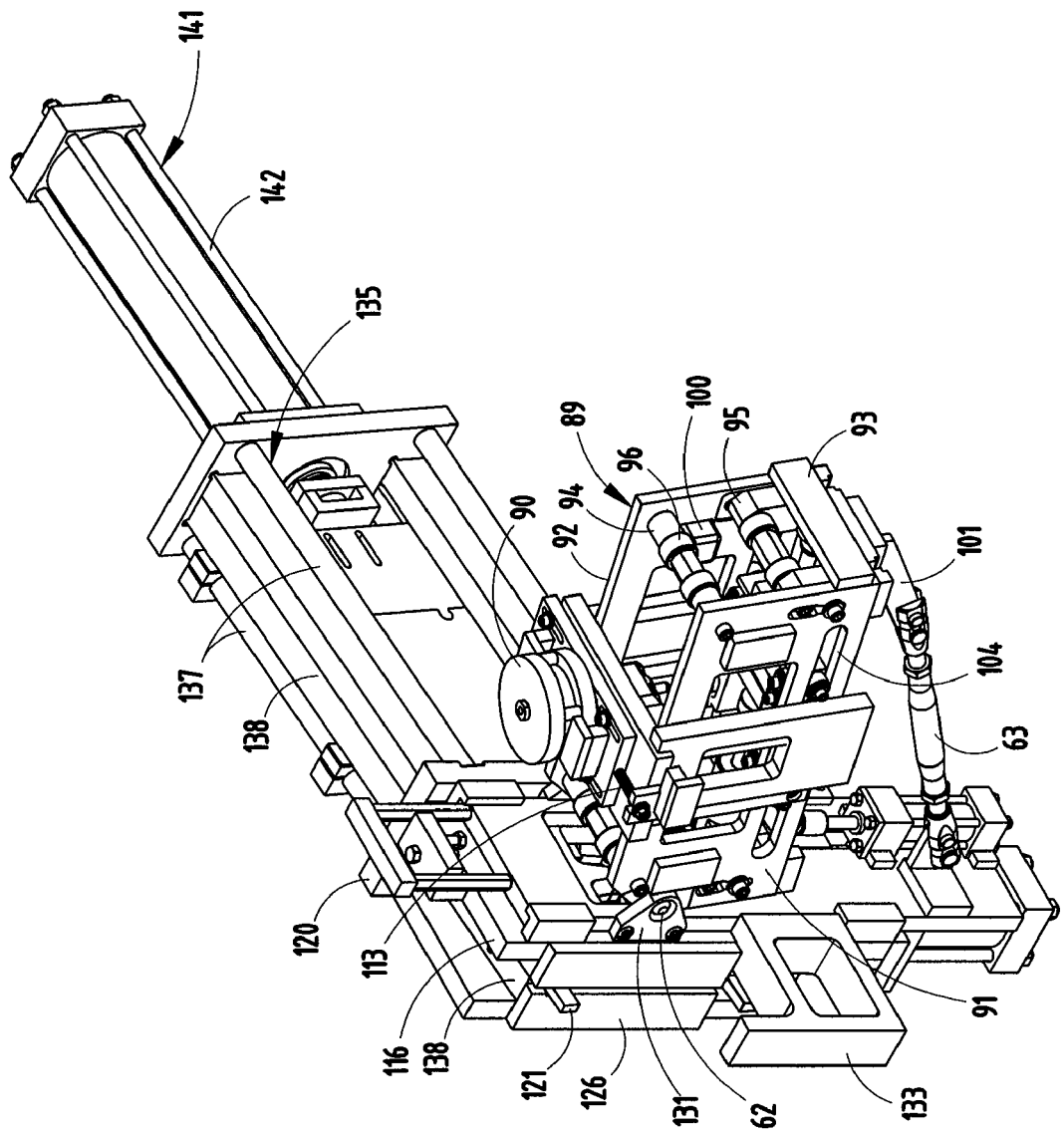
Figure 6:
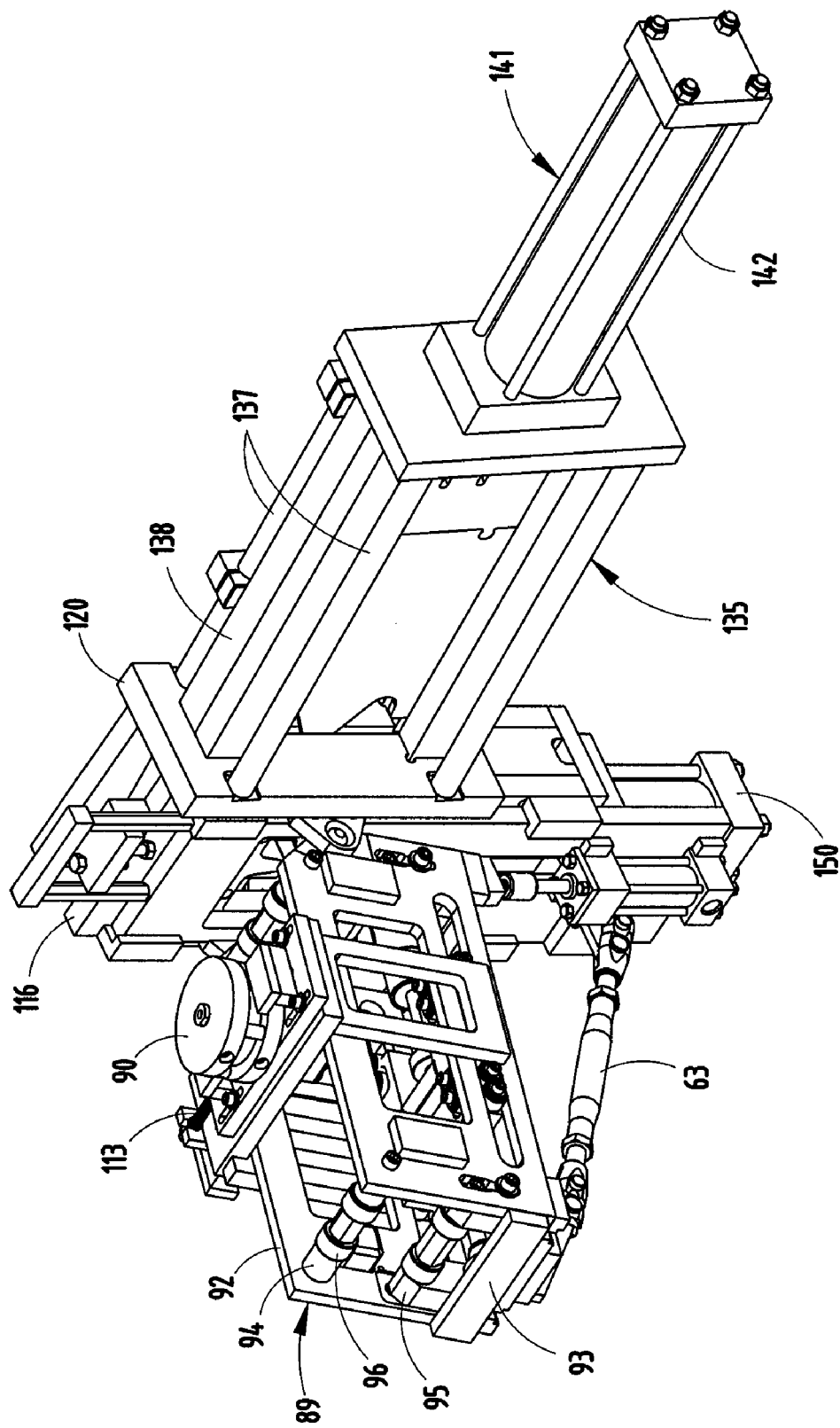

The cutoff blade 64 and its actuator 141 (FIG. 10) are attached to the side plate 120 and includes a blade box guide 135 for guiding movement of the cutoff blade 64. The blade box guide 135 includes opposing end plates 136 and 120, guide posts 138 and 139 with slots 140 therein for guiding sliding movement of the cutoff blade 64, and tie rods 137 for holding the end plates 136 and 120 together. An actuator 141 is mounted to and extends laterally from the outer end plate 136, and includes a cylinder 141 and an extendable rod (not visible) connected to the cutoff blade 64 by a guillotine blade connector plate 143. Straps 144 connected between the tie rods 137 (FIG. 4) hold for proximity switches that sense the cutoff blade position. The actuator 141 is operably connected to a pressure line and valving operated by the controller 59 for timed actuation.

It is contemplated that the present sweep unit 55 can be positioned to sweep the continuous beam 56 horizontally in a sideways direction instead of vertically. Concurrently, it is contemplated that the present cutoff unit 57 can be positioned 90 degrees from its illustrated orientation (i.e. with the actuator 141 extending vertically and the cutoff blade 64 being extended vertically downwardly during its cutting motion). In such case, the entire cutoff unit 57 can be slidably supported on a horizontally-extending flat-surfaced table top for horizontal back-and-forth movement as the continuous beam 56 is given different sweeps S1 and S2. In such case, the sweeps S1 and S2 extend in a horizontal plane parallel the flat table.

It is to be understood that variations and modifications can be made on the aforementioned structure without departing from the concepts of the present invention, and further it is to be understood that such concepts are intended to be covered by the following claims unless these claims by their language expressly state otherwise.

The embodiments of the invention in which an exclusive property or privilege is claimed are defined as follows:

1. A cutoff unit for receiving a continuous beam from a roll former apparatus having a sweep unit, where a length of the continuous beam has different longitudinal sweeps defining different radii along the length formed by the sweep unit, comprising:
    a pickup device that rollingly engages and tracks with the continuous beam as the continuous beam exits the roll former apparatus, the pickup device including an extendable pickup member for engaging the beam to cause the pickup device to temporarily move with the continuous beam and including a shock absorber to reduce impact when the pickup member engages the continuous beam and first begins to move therewith;
    a cutter device attached to the pickup device for cutting the continuous beam; and
    a controller operably connected to the pickup device and to the cutter device to actuate the extendable pickup member to engage the continuous beam and then actuate the cutter device to cut a beam segment of predetermined length from the continuous beam; and
    a support supporting at least portion of the weight of the pickup device at multiple different-height home positions to accommodate an oscillating movement of the continuous beam caused by the different longitudinal sweeps imparted by the sweep unit as the continuous beam exits the sweep unit, and also constructed to accommodate longitudinal movement of the cutter device with the beam during a cutting operation.

2. The cutoff unit defined in claim 1, including a support supporting the pickup and cutoff devices proximate a center of gravity of a combination of the devices for rotational movement as the continuous tubular beam exits the roll former apparatus.

3. The cutoff unit defined in claim 1, wherein the continuous beam is tubular, and wherein the pickup device and the cutter device are movably supported and adapted to receive the tubular beam as a position of the tubular beam changes dramatically as the tubular beam exits the roll former apparatus due to the different longitudinal sweeps.

4. The cutoff unit defined in claim 1, wherein the extendable pickup member includes a pin shaped and adapted to engage a feature in the continuous beam.

5. The cutoff unit defined in claim 4, wherein the pickup pin is carried by an adjustment plate on the pickup device.

6. The cutoff unit defined in claim 4, wherein the pickup device includes an actuator for extending and retracting the pickup pin.

7. The cutoff unit defined in claim 1, wherein the pickup device includes a shock absorber to control acceleration as the pickup device engages the continuous beam.

8. The cutoff unit defined in claim 1, wherein the support comprises a counterbalance supporting the entire weight of the cutoff device and the pickup device.

9. The cutoff unit defined in claim 1, wherein the pickup device includes rollers engaging the continuous beam as the different longitudinal sweeps pass through the pickup device.

* * * * *